Sept. 17, 1968  A. R. SCOTT  3,401,523
ANTI-SKID CONTROL VALVE
Filed Feb. 15, 1967
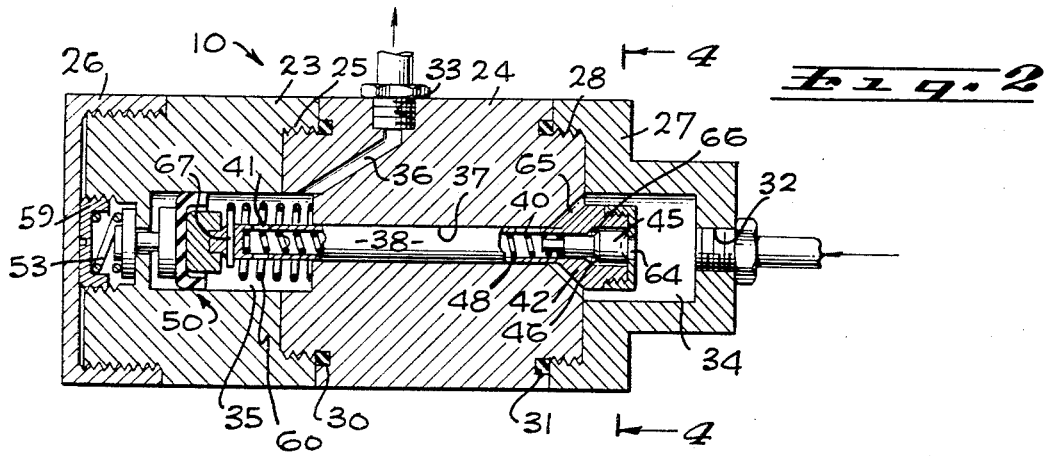
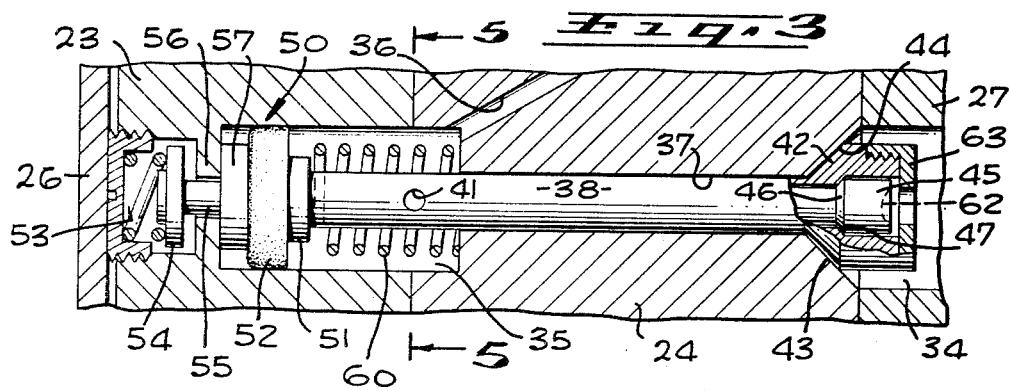
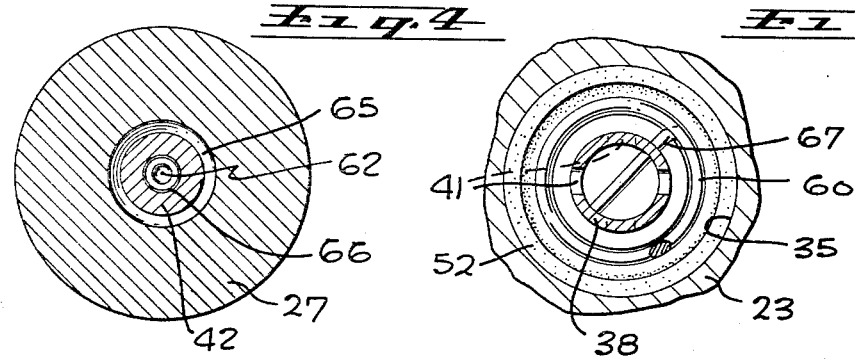
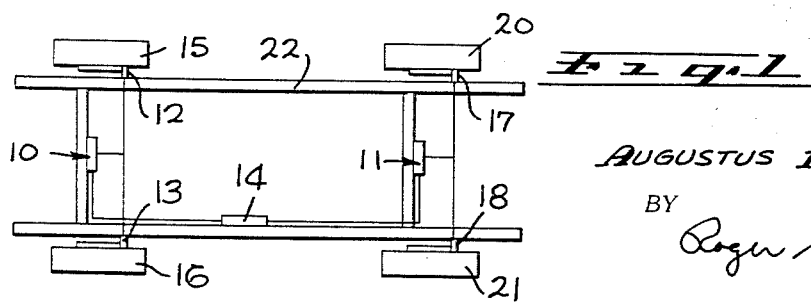
INVENTOR.
AUGUSTUS R. SCOTT
BY
Roger A. Marra 3,401,523
ANTI-SKID CONTROL VALVE
Augustus R. Scott, Los Angeles, Calif.
(8934 Murietta Ave., Panorama City, Calif. 91402)
Filed Feb. 15, 1967, Ser. No. 616,381
12 Claims. (Cl. 60—54.5)

ABSTRACT OF THE DISCLOSURE

A valve body is provided with a pair of chambers communicating with an input port and an output port respectively disposed in the hydraulic line of a vehicle brake system. A rectilinearly moving valve mechanism includes a hollow stem having a plurality of apertures disposed along its length so as to conduct fluid between the pair of chambers during normal braking conditions. The stem is provided with a closure head at one end in the input chamber adapted to seal against fluid flow under emergency braking conditions. Spring biasing is employed to normally maintain the fluid passage open between the chambers.

RELATED APPLICATIONS

The present invention is related to co-pending applications entitled, "Control Valve," filed on May 17, 1966 having Ser. No. 550,714, now Patent No. 3,377,109, and "Vehicle Brake System Control Valve," filed on July 13, 1966, having Ser. No. 564,799.

BACKGROUND OF THE INVENTION

1. Field of the invention

This invention relates to control valves and, more particularly, to a novel anti-skid control valve incorporated into a fluid brake system for motor vehicles capable of preventing vehicle skidding under emergency or panic driving conditions.

2. Description of the prior art

Control of a motor vehicle as it is started, stopped, or in making turns depends almost entirely upon the friction in the four small areas where the tires touch the road. Without the friction between the road and the tires, a motor vehicle will not respond in the usual way to the steering wheel, to the accelerator or to the brake. When the tread on the vehicle's tires is good, and the road is dry and smooth, there is a high degree of friction and the vehicle can be operated to move in a predictable way so that the driver can control the vehicle. Oftentimes, a vehicle is in motion which tends to skid instead of stop when the brakes are applied. Such lack of car response when the driver operates the braking control is the result of not having enough friction between the tires and the roadway.

Not only does the vehicle move forward by means of friction, but it also stops by means of friction, i.e., friction between the tires and the road and also within the brakes. When the driver depresses the brake pedal to apply the brakes, the linings of the brake shoes are forced against the brake drums in the wheels. The friction of the brake linings against the drums slows the turning of the four wheels. This increases the friction between the tires and the road, and the car or vehicle will stop. Therefore, the key points in a brake stop are firstly, the point of contact between brake shoe and brake drum and secondly, the point of contact between tires and the road.

The efficiency of a vehicle's brakes depends on the friction between the brake lining and the brake drum. If brakes are applied too strongly or too suddenly, such as under emergency or panic conditions, the friction between the brake lining and the brake drum is so much greater than the friction between the tires and the pavement that the wheels stop, or "lock." Upon this occurrence, the vehicle's tires skid and the vehicle goes out of control, because the driver cannot steer as long as the front wheels are locked. The most efficient braking and, therefore, the quickest braking is achieved by applying the vehicle's brakes in a hard and fast manner; even in an emergency condition, the braking distance of the vehicle is lengthened and the driver loses the ability to steer the vehicle away from any collision situations.

Attempts to avoid vehicle locking are set forth in my co-pending applications noted above. Although the control valve disclosed therein will prevent wheel lock under emergency or panic braking conditions, it is believed that the device of the present invention provides a more positive closure action by commanding more precise control on the hydraulic fluid passing through the control valve so as to achieve increased efficiency and improved reliability characteristics.

SUMMARY OF THE INVENTION

Therefore, the skidding problems and difficulties encountered which result from uncontrollable wheel lock when a vehicle driver or operator suddenly applies braking pressure are overcome by the present invention in which a novel control valve is employed in a conventional brake system operably disposed between the system's master brake cylinder and the front and/or rear wheel brake cylinders.

In a preferred embodiment of the present invention, the control valve includes a body having a hydraulic fluid input port communicating with an input chamber and an output port communicating with an output chamber wherein the chambers are internally communicated by means of a central passageway provided in the stem of an elongated valve member reciprocally carried by said body. The valve member stem is hollow and includes a plurality of apertures formed about its opposite ends in such a manner that when the valve means is normally biased so that a first closure member carried by the valve means projects into the input chamber, fluid may readily pass from the input chamber through the apertures and the hollow bore of the stem into the output chamber and then the output port. Under braking conditions, the valve means will be forced against its biasing means so that the first closure member seals the primary fluid passageway about the first closure member. A second closure means carried by the first closure member is activated by the extreme pressure exerted in the input chamber under emergency braking conditions to close a secondary passageway extending through the first closure means to the bore of the stem. The second closure means is resiliently biased by means of a spring within the hollow bore of the valve means stem so that the biasing of the second closure means renders the secondary passageway normally open to the transmission of fluid around the second closure means. When both the primary and secondary passageways are closed by the first and second closure means respectively, in response to depression of the brake pedal under panic or emergency conditions, the application of a high hydraulic fluid pressure surge to the wheel cylinders via the output port is prevented, which would normally cause wheel lock. Thereby, the hydraulic fluid in the system is rendered immovable by the closure of the fluid passageways by the respective closure means whereby the various wheel cylinders cannot be locked.

Therefore, it is a primary object of the present invention to provide a novel anti-skid control valve susceptible for incorporation into a conventional brake system for vehicles that is not only sensitive to normal braking conditions, but that is primarily responsive to emergency or panic braking condition to prevent or restrict the flow of hydraulic fluid in the brake system from being applied to the vehicle wheel cylinders which would normally result in wheel lock.

Another object of the present invention is to provide a novel anti-skid control valve for motor vehicle brake systems that includes a pair of passageways and respective closure means for independently terminating the flow of fluid therethrough in which hydraulic fluid is metered therethrough in response to the application of foot pedal braking pressure so as to prevent a high hydraulic fluid pressure surge from being applied to the vehicle wheel cylinder during emergency or panic braking conditions.

Another object of the present invention is to provide a novel anti-skid control valve of the character described that incorporates a pair of passageway closure means operable in response to hydraulic pressure to independently open and close a pair of passageways leading to a central fluid chamber whereby the flow of hydraulic fluid through the valve is controlled by the pressure of the hydraulic fluid as a function of the application of brake pedal pressure.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a schematic illustration of a conventional vehicle brake system employing the novel control valve of the present invention;

FIGURE 2 is a longitudinal cross-sectional view of the control valve employed in the system shown in FIGURE 1 illustrating the mechanism thereof and the relative position of the mechanism when the brakes are not applied;

FIGURE 3 is an enlarged sectional view of the control valve illustrating the valve mechanism thereof disposed in position under emergency or panic conditions effective to avoid wheel lock;

FIGURE 4 is a transverse cross-sectional view of the control valve as taken in the direction of arrows 4—4 of FIGURE 2; and FIGURE 5 is a transverse cross-sectional view of the control valve illustrated in FIGURE 3 and taken in the direction of arrows 5—5 thereof.

DESCRIPTION OF THE PREFERRED EMBODIMENT

Referring to FIGURE 1, a conventional brake system for a motor vehicle is diagrammatically illustrated employing the novel control valve of the present invention as indicated by numerals 10 and 11, respectively. Control valve 10 is illustrated in the brake hydraulic line extending between the front wheel brake cylinders 12 and 13 and a master cylinder 14. Brake cylinder 12 is employed for braking a wheel 15 while brake cylinder 13 is employed for braking a wheel 16. Control valve 11 is incorporated into the brake hydraulic line extending between the master cylinder 14 and wheel brake cylinders 17 and 18 employed for braking rear wheels 20 and 21, respectively. The interposing of the control valves 10 and 11 between the front and rear brake wheel cylinders and the master cylinder insures complete control of the hydraulic fluid employed in the brake system for actuating the wheel cylinders. However, it is to be understood that although control valves 10 and 11 are employed in controlling the front and rear wheel brake cylinders, only control valve 10 may be employed, if desired, for control of the front wheel cylinders per se. All fluid pressure exerted from the master cylinder 14 responsive to brake pedal depressions is under the influence of the control valves 10 and 11. The control valves as well as the master cylinder may be readily mounted to convenient locations on a chassis 22 of the motor vehicle.

Referring more specifically to FIGURE 2, control valve 10 is illustrated in cross-section so that the parts and components are more clearly seen. However, it is to be understood that the control valve 11 is constructed in an identical manner to the control valve 10. The control valve includes a body consisting of sections 23 and 24 which are connected together by means of a threaded arrangement 25. The opposite ends of the body are closed by means of a cap 26 which is arranged in threadable engagement with the end of section 23 and a closure cap 27 which is threadably coupled to the end of body section 24 by threaded arrangements 28. Elastomeric seals 30 and 31 are suitably carried on the opposite ends of body section 24 adjacent the threaded arrangements 25 and 28 so as to effect a suitable sealing relationship between the ends of body section 24 and section 23 and cap 27 respectively. The body may be readily attached to the chassis or other available supporting structure of the motor vehicle.

The control valve includes an input port 32 formed in the closure cap 27 which may be readily connected into the brake hydraulic line leading to the master cylinder 14 while an output port 33 is provided in the body section 24 which may lead to the wheel cylinders 12 and 13.

Input port 32 communicates with an input chamber 34 formed in the closure cap 27 while an output chamber 35 is formed in body section 23 and body section 24 which communicates with output port 33 via a passageway 36. Body section 24 is provided with an annular channel 37 which is coaxial with the chambers 34 and 35 as well as with the body sections 23 and 24. Disposed within the annular channel 37 and arranged to reciprocally move therein, there is provided a valve mechanism which includes a hollow stem 38 having a plurality of apertures, such as aperture 40, carried at one end thereof and adapted to selectively communicate with input chamber 34 and a plurality of apertures, such as aperture 41, adapted to communicate with output chamber 35 at the other end of the stem 38.

By this construction, apertures 40 are adapted to communicate with input chamber 34 and apertures 41 are adapted to communicate with output chamber 35. One end of the stem of the valve mechanism includes a first closure means 42 which is of larger diameter than the stem and includes a annular tapered surface 43 adapted to close against an annular tapered recess 44 to terminate communication of fluid flow from the input chamber to the input apertures 40. Conversely, when the valve mechanism is in the position as shown in FIGURE 2, a primary fluid passageway exists between the opposing surfaces 43 and 44 which will permit fluid within the chamber 34 to be transmitted under normal braking pressure through the input apertures 40 into the bore of stem 38 and into the output chamber 35 via the apertures 41.

A second closure means indicated by numeral 45 is reciprocally located and carried on the first closure means 42 in coaxial relationship therewith which is similar in construction and operation to the closure means 42. The second closure means 45 includes a tapered annular surface 46 adapted to close against tapered wall 47 to terminate the flow of hydraulic fluid from input chamber 34 past the second closure means into the bore of stem 38. The second closure means 45 is biased by means of expansion spring 48 so that a secondary fluid passageway exists about the second closure means 45 between the opposing wall surfaces 46 and 47 respectively.

The end of stem 38 of the valve mechanism situated in chamber 35 includes a piston member 50 which comprises a body 51 situated in a flexible cup member 52 having annular side walls slideably engageable with the inner side wall defining the chamber 35. Disposed on one side of the piston member 50, there is provided an expansion spring 53 that is arranged to expand against an annular retainer 54 on one end and against a removable plug element 59 on its other end. The annular retainer 54 includes a body portion 55 adapted to slide within a bore defined by an annular stop member 56. The other end of the body portion 55 terminates in an element 57 adapted to abut against the cup 52. Therefore, it can be seen that by means of spring 53, the retainer 54 is pressed in abutting engagement with the stop 56 when no hydraulic fluid pressure is applied to the valve mechanism. However, when pressure is applied via the first closure means 42, the valve mechanism moves within channel 37 and the movement is arrested by means of abutting engagement of the element 57 with the other side of stop member 56. A spring 60 is employed to bias the valve mechanism in a direction so that the cup member 52 will seat against the element 57. However, the tension of the spring 53 is set so as to normally urge the piston member and the valve mechanism in the general direction of the input port 32 so that it may be said that the valve mechanism is normally biased so that the primary passageway is maintained open to permit the flow of hydraulic fluid between chambers 34 and 35. The tension of spring 48 is such that the second closure means 45 is normally biased to permit the flow of fluid therearound so that fluid is introduced into the output chamber 35. Preferably, the tension of spring 48 is set just under wheel lock conditions so that the secondary passageway may be maintained open during normal driving and braking conditions. However, upon application of emergency of panic brake pedalling, the high resultant hydraulic fluid surge will cause the closure means 45 to close the secondary passageway by overcoming the tension of spring 48. As previously stated, this occurrence will take place immediately before wheel lock occurs.

Referring now in detail to FIGURE 3, it can be seen that the valve mechanism has moved from the position shown in FIGURE 2 in that the element 57 is in abutting contact with stop 56. Such a condition will exist when the high fluid surge appears in the input chamber 34 under panic braking conditions. In this condition, the first closure means 42 effects a closure of the primary passageway and the second closure means 45 effects a closure of the secondary passageway. In an effort to assist in closing the second closure means in response to the high hydraulic fluid surge, the second closure means is provided with a recess 62 which effects an even distribution of the pressure on the second closure means. A feature resides in the fact that the second closure means 45 is captured within a bore provided in the first closure means and is retained therein by means of a cap 63 in threaded engagement with the first closure means and which includes an opening 64 in the cap for introducing fluid about the second closure means from the input chamber 34.

Referring to FIGURE 4, the primary passageway is indicated by numeral 65 which is defined by the opposing wall surfaces 43 and 44 and the secondary fluid passageway is indicated by numeral 66 defined by opposing wall surfaces 46 and 47. Primary passageway 65 may close under normal braking conditons when the brakes are heavily applied; however, passageway 66 is still maintained open so that fiuid may be metered to the wheel cylinders causing wheel lock. However, when the brake pedal is depressed under emergency or panic conditions, passageway 66 will also close as determined by spring 48 so that the flow of fluid to the wheel cylinders will be stopped just short of wheel lock.

FIGURE 5 more clearly illustrates the output aperture 41 and the bias spring 60. One end of the spring 60 terminates in engagement with the extreme end of stem 38 and is indicated by numeral 67, In actual operation, under normal driving conditions or when the vehicle is at rest, hydraulic fluid is supplied to input chamber 34 via input port 32. The fluid present within chamber 34 is introduced to output chamber 35 via the primary and secondary passageways 65 and 66 and through apertures 40 into the hollow bore of stem 38 and through the output apertures 41 into the output chamber 35. From the output chamber 35, the fluid is supplied through the output port 33 to the wheel cylinders of the vehicle. Springs 53 and 48 urge the closure means 42 and 45 of the valve mechanism in the direction of chamber 34 so that the primary and secondary passageways are maintained open and fluid is free to flow therethrough.

Under normal braking conditions, sufficient pressure will be developed within the input chamber 34 to overcome the biasing of spring 53 so that the valve mechanism will move in the direction of output chamber 35 to the extent that the primary passageway 65 will close. However, under normal braking, the secondary passageway 66 will still remain open and fluid will be metered therethrough and to the respective wheel cylinders. However, under emergency braking conditions, the high fluid surge developed by rapid depression of the brake pedal will cause the second closure means 45 to close against the biasing of spring 48 so that the secondary passageway will close which terminates the supply of fluid to the wheel cylinders. Such an event will occur immediately short of wheel lock.

In view of the foregoing, it can be seen that the control valve of the present invention provides precise control and handling of the hydraulic fluid in a conventional brake system in such a manner that the fluid is rendered immobile during panic braking conditions so that wheel lock is prevented. By properly adjusting the tension of springs 53 and 48, the rendering of the fluid immobile can be said to be adjustable so that the high pressure fluid surge developed under panic braking conditions is operable to close the supply of fluid to the wheel cylinder which occurs immediately prior to a wheel lock condition. The device is economical to manufacture and install and is easily assembled. In some instances, the control valve may be incorporated into the structure of the master brake cylinder, if desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. In an anti-skid braking system for
a vehicle having a master cylinder and wheel brake cylinders, the combination comprising:
a body having an input chamber in fluid communication with the master cylinder and an output chamber in fluid communication with the wheel cylinders, said body including primary and secondary fluid passageways disposed between said input and output chambers;
valve means reciprocally mounted on said body for selectively closing said primary and said secondary fluid passageways in response to hydraulic brake pressure applied by the vehicle operator whereby said primary passageway is the first to close and said secondary passageway subsequently closes when the applied hydraulic brake pressure exceeds a critical level immediately below a wheel lock pressure; and
resilient means operably coupled to said valve means and adapted to move said valve means so as to normally maintain said fluid passageways open.

2. The invention as defined in claim 1 wherein
said valve means includes a hollow stem slidably carried on said body and having input apertures and output apertures formed therein adapted to communicate the flow of fluid from said primary passageway to said output chamber.

3. The invention as defined in claim 2 wherein
said secondary passageway is formed in said valve means and normally communicates said hollow stem with said input chamber so that fluid flow exists from said input chamber to said output chamber.

4. The invention as defined in claim 3 wherein said valve means includes an enlarged closure member disposed on one end of said hollow stem and adapted to seat against said body within said input chamber to block said primary passageway.

5. The invention as defined in claim 4 wherein said first closure member includes a bore extending therethrough interconnecting said input chamber with said hollow stem which constitutes said secondary passageway; and a second closure member reciprocally disposed in said bore adapted to seat against the wall defining said bore to block said secondary passageway.

6. The invention as defined in claim 5 including a piston member fixed on the extreme end of said stem slidably disposed with said output chamber.

7. The invention as defined in claim 6 wherein said resilient means includes a coil spring compressed between the end of said body and said piston member disposed in said output chamber to forcibly urge said first closure member in the direction of said input chamber to normally open said primary passageway.

8. The invention as defined in claim 7 wherein said resilient means further includes a second coil spring compressed between said second closure member and the end of said stem carrying said piston member and being enclosed within the hollow of said stem to forcibly urge said second closure member in the direction of said input chamber to normally open said secondary passageway.

9. The invention as defined in claim 8 including a stop means carried on said body and projecting into the interior of said output chamber and adapted to limit the reciprocating movement of said first closure member.

10. In an anti-skid braking system for a vehicle having a master cylinder and wheel brake cylinders, the combination comprising:

a body having an input chamber and an output chamber operably coupled between the master cylinder and the wheel brake cylinders and being formed with an elongated bore terminating at its opposite ends with said input chamber and said output chamber respectively;

valve means including a hollow stem slidably mounted in said body bore and defining first and second fluid passageways for conducting the flow of fluid from said input chamber to said output chamber via said hollow stem;

a first closure means carried on the end of said stem disposed within said input chamber and adapted to selectively block the flow of fluid thereabout to close said first passageway;

a second closure means movably carried on said first closure means and adapted to selectively block the flow of fluid through said second passageway; and resilient means carried on said body and said stem within the hollow portion thereof adapted to independently operate said first and second closure means in response to hydraulic brake pressure applied by the vehicle operator.

11. The invention as defined in claim 10 wherein said resilient means includes a first spring for normally biasing said first closure means to open said primary passageway; and a second spring enclosed by said hollow stem for normally biasing said second closure means to open said secondary passageway.

12. The invention as defined in claim 11 wherein the tension of said first spring is substantially less than the tension of said second spring.

References Cited

UNITED STATES PATENTS 3,251,186  5/1966  De Coye De Castelet.
3,359,729  12/1967  Guettier.

MARTIN P. SCHWADRON, *Primary Examiner.*

ROBERT BUNEVICH, *Assistant Examiner.*